United States Patent

[11] 3,602,527

| [72] | Inventors | George W. Goetz<br>Detroit;<br>Darrell S. Brawn, Livonia, both of, Mich. |
|---|---|---|
| [21] | Appl. No. | 789,744 |
| [22] | Filed | Jan. 8, 1969 |
| [45] | Patented | Aug. 31, 1971 |
| [73] | Assignee | Eaton Yale & Towne Inc.<br>Cleveland, Ohio |

[54] VEHICLE SAFETY SYSTEM
6 Claims, 3 Drawing Figs.

[52] U.S. Cl. .................................................. 280/150 AB
[51] Int. Cl. ....................................................... B60r 21/06
[50] Field of Search ........................................... 280/150;
180/82, 90

[56] References Cited
UNITED STATES PATENTS

| 3,514,124 | 5/1970 | Richardson | 280/150 |
| 3,130,807 | 4/1964 | McHenry | 280/150 UX |
| 3,197,234 | 7/1965 | Bertrand | 280/150 |
| 3,243,822 | 4/1966 | Lipkin | 280/150 |
| 3,411,807 | 11/1968 | Carey et al. | 280/150 |
| 3,439,769 | 4/1969 | Brilmyer | 180/90 |
| 3,450,414 | 6/1969 | Kobori | 280/150 |
| 3,456,572 | 7/1969 | Beyer et al. | 296/70 |

FOREIGN PATENTS

| 1,474,216 | 2/1967 | France | 280/150 |

*Primary Examiner*—Kenneth H. Betts
*Attorney*—Yount and Tarolli

ABSTRACT: An improved safety apparatus for protecting an occupant of a vehicle during both critical and noncritical accidents includes a confinement which is expanded to restrain movement of the occupant of the vehicle during a critical accident. Upon the occurrence of a critical accident, the confinement is inflated by fluid which flows from a fluid supply through a diffuser. The diffuser directs the fluid flow to inflate the confinement. In addition, the diffuser is adapted to be crushed or deformed due to impact by an occupant of a vehicle thereagainst during a noncritical accident to reduce the possibility of serious injury to the occupant. To further reduce the possibility of injury to the occupant of the vehicle during a noncritical accident, the fluid supply is mounted closely adjacent to a sidewall of the passenger compartment of the vehicle where it is unlikely to be engaged by the occupant.

VEHICLE SAFETY SYSTEM

The present invention relates generally to a safety apparatus of the type including a confinement which is expanded to restrain movement of an occupant of a vehicle during a critical accident or collision hereinafter referred to as an accident.

Known safety apparatus includes a confinement which is inflated by a flow of fluid which is directed into the confinement by a diffuser. The inflated confinement protects an occupant of a vehicle by restraining his movement as a result of the accident, thereby minimizing impact of the occupant against a structural part of the vehicle.

In the past, the reservoir and diffuser have been made of heavy gauge metal and mounted in association with the dashboard of the vehicle. As a result, such structures provide somewhat of a safety hazard. More particularly, during noncritical accidents excessive braking and other occurrences in which the vehicle encountered a high degree of deceleration, an occupant of the vehicle tends to be moved forwardly against the dashboard. In which event, injury can occur unless a substantial amount of padding is provided. Of course, it should be evident that inflation of the confinement in every situation where such a degree of deceleration was experienced would be impractical. U.S. Pat. application Ser. No. 661,086, filed Aug. 16, 1967, now U. S. Pat. No. 3,514,124, is directed toward this problem and assigned to the assignee of this application.

Accordingly, an object of this invention is to provide a new and improved safety apparatus which is activated to protect an occupant of a vehicle during a critical accident and which does not compromise the occupant's safety during relatively high vehicle deceleration, such as excessive braking or a noncritical accident.

Another object of this invention is to provide a new and improved safety apparatus of the type having a confinement which is inflated in a predetermined manner by a flow of fluid through a metallic diffuser to restrain movement of an occupant of a vehicle during a critical accident, the diffuser being inelastically deformable by the impact of an occupant thereagainst during a noncritical accident to thereby minimize the possibility of injury to the occupant.

Another object of this invention is to provide a new and improved safety apparatus of the type having a confinement which is inflated by a flow of fluid from a reservoir to restrain movement of an occupant of a vehicle during a critical accident, the reservoir being disposed adjacent to one side of the vehicle to thereby minimize the possibility of an impact of the occupant against the reservoir during a noncritical accident.

Another object of this invention is to provide a new and improved safety apparatus of the type having a confinement which is inflated in a predetermined manner by a flow of fluid through a diffuser to thereby enable the confinement to restrain movement of an occupant of a vehicle during a critical accident wherein the diffuser includes a metallic wall having sufficient strength to withstand pressures exerted thereagainst by a flow of fluid from the reservoir upon inflation of the confinement during a critical accident and wherein the metallic wall is deformable under the influence of an impact of an occupant of a vehicle thereagainst during a noncritical accident.

These and other objects and features of the invention will become more apparent upon a consideration of the following description taken in connection with the accompanying drawing wherein.

The present invention provides a safety apparatus of the type having a confinement which is expanded to restrain movement of an occupant of a vehicle during a critical accident. Upon the occurrence of a critical accident, the confinement is inflated by fluid which flows from a reservoir, through a diffuser and into the confinement in a predetermined manner. In accordance with the present invention, the diffuser is made of a material which is crushable or inelastically deformable upon impact of an occupant thereagainst during a noncritical accident. This crushing or deforming of the diffuser absorbs the kinetic energy of the occupant in such a manner as to reduce the possibility of injury to the occupant during a noncritical accident. The possibility of injury to the occupant during a noncritical accident is further reduced by mounting the rigid reservoir adjacent to one side or the wall of the vehicle. When the reservoir is so mounted, there is a minimal possibility of the occupant being injured by hitting or impacting against the unyielding reservoir during a noncritical accident.

Figure 1:
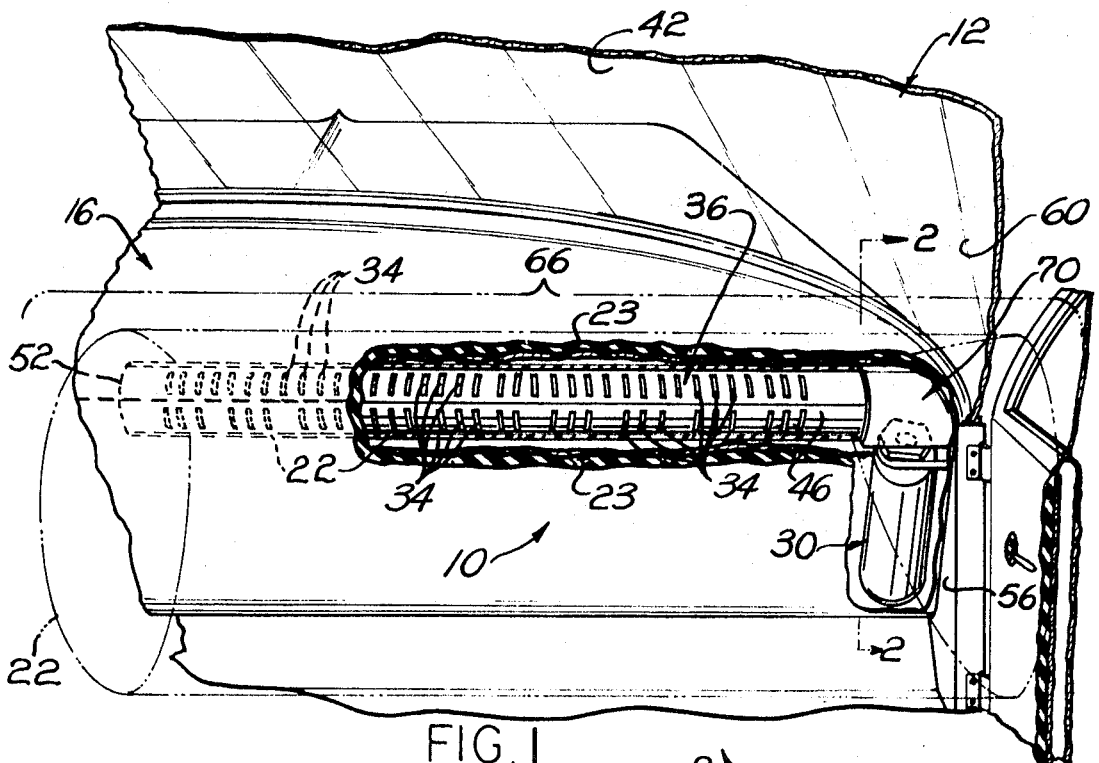
FIG. 1 is a partially broken away, schematic illustration of a vehicle in which there is provided a safety apparatus constructed in accordance with the present invention, the safety apparatus including a confinement which is inflated by fluid from a reservoir upon the occurrence of a critical accident.

Although a safety apparatus 10 constructed in accordance with the present invention can be used to protect occupants of many different types of vehicles, such as tractors, trucks, boats and airplanes, the safety apparatus 10 is illustrated in FIG. 1 is association with an automotive vehicle 12. In the present embodiment of the invention, the safety apparatus 10 is mounted on a dashboard 16 of the vehicle 12. The safety apparatus 10 includes a confinement 22 which is normally stored in a collapsed condition (see FIG. 2) under suitable padding 23 on the dashboard 16. Upon the occurrence of a critical accident, that is, an accident in which there is a substantial possibility of injury to an occupant of the vehicle 12, the confinement 22 is inflated to an expanded condition shown in dashed lines in FIG. 1. In the expanded condition, the confinement 22 protects an occupant of the vehicle during the critical accident by restraining his movement and absorbing his kinetic energy. Of course, this expansion of the confinement ruptures the dashboard padding 23.

Figure 3:
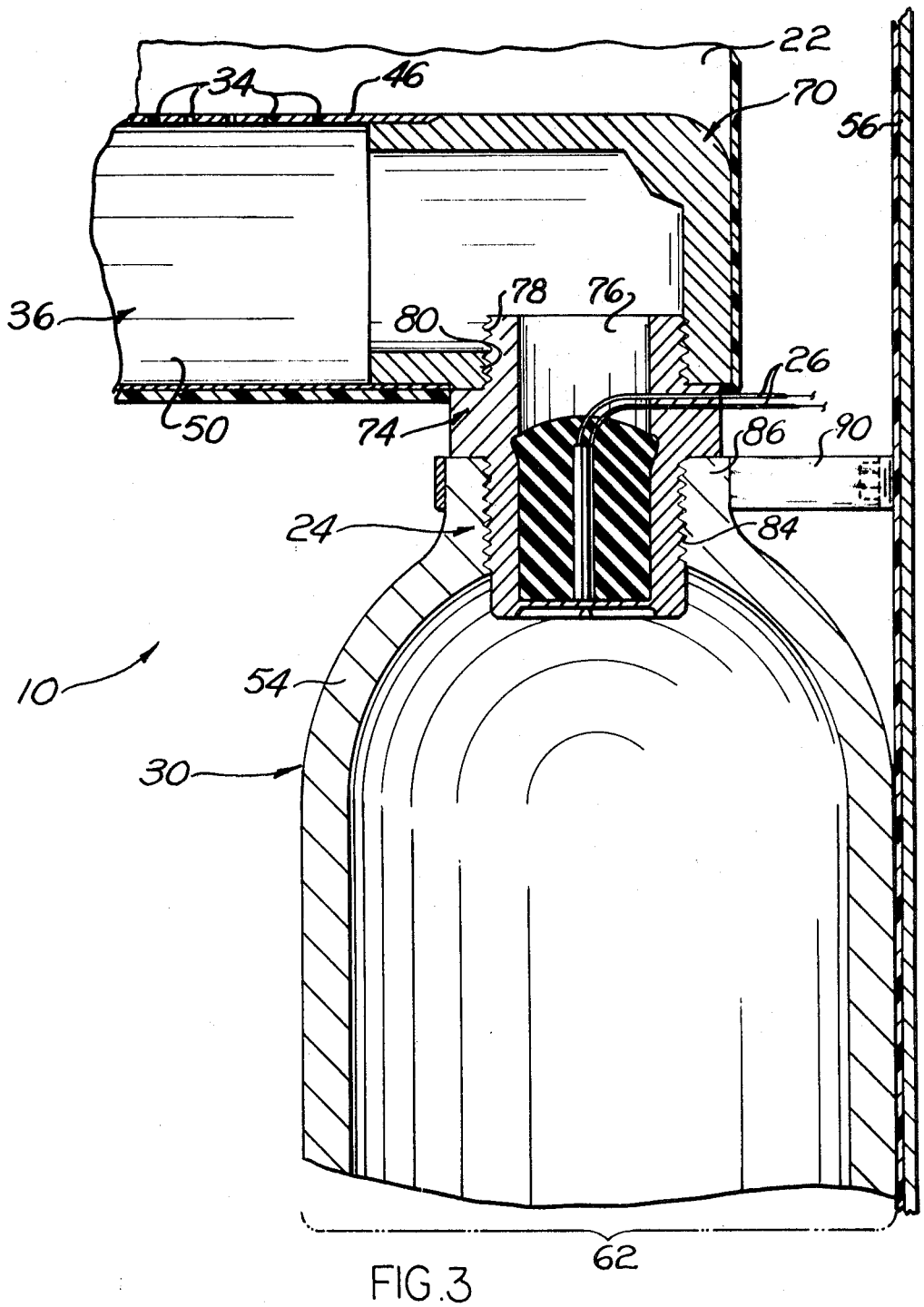
FIG. 3 is an enlarged sectional view, taken along the line 3—3 of FIG. 2, further illustrating the relationship of the reservoir to the diffuser and the wall of a vehicle.

A known sensor assembly (not shown) is provided for detecting the occurrence of a critical accident and activating the safety apparatus 10. Accordingly, the safety apparatus 10 includes a valve assembly 24 (FIG. 3) which is electrically connected with the sensor assembly by leads 26. Upon operation of the sensor assembly, the leads 26 are energized to actuate the valve assembly 24 to an open condition. After the valve assembly 24 has been so operated, fluid can flow under pressure from a reservoir 30 through apertures or slots 34 in a diffuser 36 to inflate the confinement in a predetermined manner. Although different types of valve assemblies can be utilized for controlling a flow of fluid from the reservoir 30, the valve assembly 24 is advantageously of the explosively actuated type, more fully disclosed in application Ser. No. 730,024, filed on May 17, 1968 by George A. Ekstrom, and entitled "Vehicle Safety Apparatus."

During a critical accident, the confinement 22 absorbs the kinetic energy of the occupant to thereby restrain his movement and prevent hitting or impacting of the occupant against a windshield 42 or other part of the vehicle 12. When the vehicle encounters a high degree of deceleration, such as during excessive braking or during a noncritical accident, that is, an accident in which there is a relatively small possibility of injury to an occupant of the vehicle 12, the safety apparatus 10 remains in the inactive condition of FIG. 2. The safety apparatus 10 is not activated during these noncritical accidents, since the vehicle 12 will encounter many of them during its normal operation, for example, when the vehicle 12 hits a bump in the road or is banged against an object during parking. The sensor assembly which activates the valve assembly 24 is capable of distinguishing between a critical accident and the degree of deceleration as results in a noncritical accident. Such a sensor is disclosed in U.S. application Ser. No.

753,946, filed Aug. 20, 1968 by Hermann Kaiser and George W. Goetz and entitled "Collision Sensor". Since the occupants of the vehicle 12 are usually able to resist the effects of such noncritical accidents without being injured, expansion of the confinement 22 would be unduly alarming to the occupants and distracting to the driver of the vehicle.

While an occupant of the vehicle 12 will usually be able to successfully resist the effects of a noncritical accident, the occupant may be caught off balance or for some other reason be unable to successfully resist the effects of the noncritical accident. In such an event, the occupant may hit or impact against the dashboard 16 while the safety apparatus 10 is in the inactive condition of FIG. 2. To minimize the possibility of injury to the occupant upon hitting or impacting against the dashboard 16 during such a noncritical accident, the diffuser 34 is adapted to be inelastically deformed or permanently crushed as a result of the impact of the occupant against the dashboard 16. This crushing or deforming of the diffuser 34 absorbs the kinetic energy of the occupant and restrains his movement in such a manner as to substantially reduce the possibility of injury to him during the noncritical accident.

In addition to crushing or deforming under the influence of an impact by an occupant during a noncritical accident, the diffuser 36 must have sufficient strength to withstand the fluid pressures which are exerted against the diffuser by the fluid which flows from the reservoir 30 to inflate the confinement 22 during a critical accident. To these ends, the diffuser 36 includes a cylindrical metallic wall 46 (FIGS. 2 and 3) which is inelastically deformable or crushable under the influence of the relatively small impact forces which may be applied thereagainst by an occupant of a vehicle during a noncritical accident. However, the wall noncritical has sufficient transverse thickness and rigidity of configuration to enable the wall to absorb these noncritical impact forces and to enable the wall to successfully resist the pressure forces applied by fluid flowing from the reservoir into the confinement 32. By experimentation, it has been determined that the wall 46 will have both the requisite strength and crushability characteristics if it is made of steel having the thickness of between 0.018 of an inch and 0.035 of an inch.

During a critical accident, the diffuser 36 directs the flow of fluid into the confinement 22 to inflate the confinement in a predetermined manner. To provide for this direction of the flow of fluid into the confinement 22, the slots 34 are spaced along a side of the diffuser 36 which is toward the occupant of the vehicle 12 (see FIG. 1). In order for the slots 34 which are farthest from the reservoir 30 to be effective for directing a flow of fluid into the confinement 22, a longitudinally extending cylindrical central chamber 50 of the diffuser (see FIG. 2 taken in conjunction with FIG. 1) must be at last slightly pressurized by the flow of fluid from the reservoir 30. To this end, the diffuser is closed at one end 52 and the slots 34 are sized so as to properly direct the flow of fluid from the reservoir 30 into the confinement 22.

In addition to being sized and located so as to provide desired fluid flow characteristics, the slots 34 must be sized and arranged so that they do not unduly weaken the diffuser 36. For example, if the slots 34 are closely spaced and extended almost entirely around the diffuser 36, the diffuser would be relatively weak. To enable such a diffuser to withstand the pressure forces resulting from the flow of fluid through the diffuser, the wall of the diffuser would have to be so thick so as to prevent the diffuser from being crushed or deformed under the influence of impact forces applied thereagainst by occupant during a noncritical accident. By experimentation, it has been determined that a diffuser 36 having a steel wall 46 of a thickness of between 0.018 of an inch and 0.035 of an inch has the requisite strength and crushability characteristics if its diameter is approximately two inches. In such a diffuser, the slots 34 should have a cross-sectional area of approximately 0.06 square inches and be spaced apart by a distance of between 0.5 and 0.7 of an inch.

To enable the reservoir 30 to withstand very high fluid pressures, the reservoir has a rigid wall 54. To minimize the possibility of an occupant of a vehicle being injured by hitting or impacting against the unyielding wall 54 during a noncritical accident, the reservoir 30 is mounted in an out-of-the-way location against a longitudinally extending side or wall 56 of the vehicle. Even when the reservoir 30 is mounted in this out-of-the-way location, the reservoir should extend or project transversely outwardly from the wall 56 into the passenger compartment 60 (FIG. 1) of the vehicle 12 for a distance, indicated at 62 in FIG. 3, which is less than one-fourth of the transverse extent of the expanded confinement 22, indicated at 66 in FIG. 1. In fact, it has been determined that the distance 62 should, advantageously, be approximately 5 inches or less.

Figure 2:
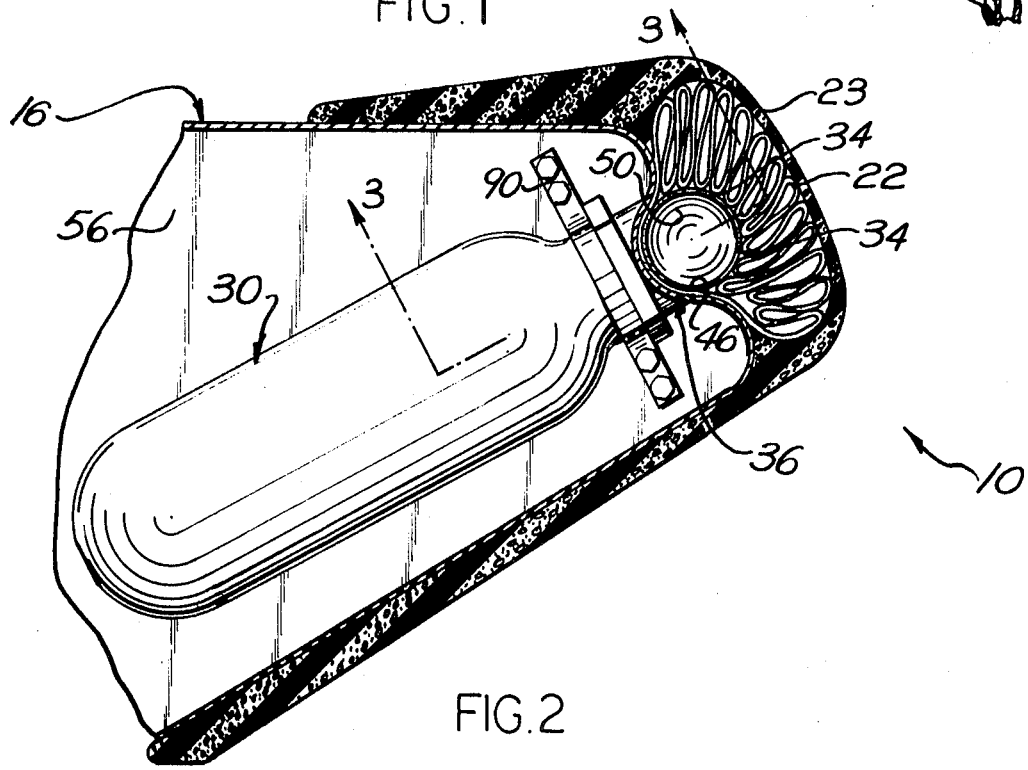
FIG. 2 is an enlarged sectional view, taken along the line 2—2 of FIG. 1, illustrating the relationship of the reservoir to a diffuser for directing a flow of fluid from the reservoir into the confinement.

It has also been found to be advantageous to mount the reservoir 30 adjacent the dashboard 16 in a forwardly and downwardly extending orientation illustrated in FIG. 2. A connector 70 is secured to one end portion of the diffuser 36 (see FIG. 3) to connect the diffuser in fluid communication with reservoir 30. To facilitate connection of the reservoir 30 to the connector 70, the vale assembly 24 includes a housing member 74 having an outer end portion 76 which is threaded at 78 and engages corresponding internal threads 80 formed in the connector 70. In addition to the outer threads 78, the housing 74 includes threads 84 which engage mating threads formed at the neck 86 of the reservoir 30. It is contemplated that the safety apparatus 10 will be assembled by merely screwing the outer threads 78 into the threads 80 on the connector member 70 to thereby attach the fluid reservoir 30 to the diffuser 36. Once the reservoir has been attached to the diffuser 36, the reservoir can be readily secured to the side or wall 56 of the vehicle 12 at the desired angle by any suitable means, such as a strap 90.

In view of the foregoing description, it will be apparent that the safety apparatus 10 functions to protect an occupant of a vehicle during both critical and noncritical accidents. To this end, the safety apparatus 10 includes a confinement 22 which is expanded during a critical accident to restrain movement of an occupant of a vehicle by absorbing his kinetic energy. The confinement 22 is expanded in a predetermined manner by a flow of fluid under pressure from the reservoir 30. To effect the expansion of the confinement 22 in a predetermined manner, the fluid from the reservoir 30 enters the confinement 22 through the diffuser 36 which has a plurality of slots 34 arranged to direct the fluid flow.

During a noncritical accident, the safety apparatus 10 also protects an occupant of a vehicle by restraining his movement and absorbing his kinetic energy in such a manner as to minimize the possibility of injury. To this end, the diffuser 36 is constructed in such a manner as to be deformable or crushable under the influence of an impact of the occupant against the diffuser during a noncritical accident. To provide the diffuser 36 with the desired deformability during a noncritical accident and sufficient strength to withstand the pressure exerted against the diffuser by the flow of fluid from the reservoir 30 during a critical accident, the diffuser is advantageously made of steel having a thickness of between 0.018 of an inch and 0.035 of an inch.

To further reduce the possibility of injury to an occupant of the vehicle 12 during a noncritical accident, the reservoir 30 is mounted in an out-of-the-way place against the sidewall 56 of the vehicle 12. In addition, the reservoir 30 is shaped so that it extends transversely outwardly from the wall 56 for a distance 62 which is less than one fourth of the transverse extent 66 of the expanded confinement 22. Preferably, the distance 62 is approximately 5 inches or less.

We claim:

1. Safety apparatus for protecting an occupant of a vehicle comprising a confinement having a collapsed inoperative condition and an expanded operative condition for restraining movement of the occupant during a collision, means for expanding said confinement to said operative condition during a collision which may be critical to the occupant, said means for expanding said confinement including a diffuser means inelastically deformable as a result of occupant impact thereagainst during a collision which is noncritical to the occupant, the deformation of said diffuser means absorbing at least a part of the occupant's energy of impact to minimize the possibility of injury to the occupant, said diffuser means being supported by the dashboard of the vehicle, said means for expanding said confinement further including a fluid reservoir disposed on the vehicle in spaced relationship relative to said diffuser means to minimize the chance of impact therewith by the occupant of the vehicle, and said fluid reservoir being supported by the dashboard of the vehicle in a position adjacent a door of the vehicle.

2. Safety apparatus for protecting an occupant of a vehicle comprising a confinement having a collapsed inoperative condition and an expanded operative condition for restraining movement of the occupant during a collision, means for expanding said confinement to said operative condition during a collision which may be critical to the occupant, said means for expanding said confinement including a diffuser means inelastically deformable as a result of occupant impact thereagainst during a collision which is noncritical to the occupant, the deformation of said diffuser means absorbing at least a part of the occupant's energy of impact to minimize the possibility of injury to the occupant, said diffuser means being supported by the dashboard of the vehicle, said means for expanding said confinement further including a fluid reservoir disposed on the vehicle in spaced relationship relative to said diffuser means to minimize the chance of impact therewith by the occupant of the vehicle, and said fluid reservoir being supported on the dashboard of the vehicle and extending downwardly and angularly therefrom away from the occupant.

3. Safety apparatus for protecting an occupant of a vehicle during a collision, said safety apparatus comprising a confinement expandable from a collapsed condition to an expanded condition in which said confinement is adapted to restrain movement of the occupant of the vehicle, said confinement in said expanded condition extending for a first distance transversely of said vehicle, and means for expanding said confinement to the expanded condition during a collision critical to the occupant, said means including a fluid reservoir disposed adjacent to a longitudinally extending side portion of the vehicle and extending transversely of the vehicle for a second distance which is less than one-fourth of said first distance to thereby minimize the possibility of impact of the occupant with the fluid reservoir during a collision noncritical to the occupant, said means for expanding said confinement during a critical collision further including diffuser means extending transversely of the vehicle for directing a flow of fluid into the confinement, said fluid reservoir being mounted at one end of said diffuser means, and further including a member having first and second threaded end portions for interconnecting said fluid reservoir and said diffuser means, said first end portion being connected to said fluid reservoir and said second end portion being connected to said diffuser means.

4. Safety apparatus for protecting an occupant of a vehicle during a collision, said safety apparatus comprising a confinement expandable from a collapsed condition to an expanded condition in which said confinement is adapted to restrain movement of the occupant of the vehicle, said confinement in said expanded condition extending for a first distance transversely of said vehicle, means for expanding said confinement to the expanded condition during a collision critical to the occupant, said means including a fluid reservoir disposed adjacent to a longitudinally extending side portion of the vehicle and a diffuser adapted to receive fluid from said reservoir and direct the fluid into the confinement, said diffuser being of a generally tubular configuration and having the longitudinal axis thereof extending at substantially 90° relative to an axis of the reservoir, connector means cooperating with said diffuser and said reservoir for directing fluid from said reservoir into said diffuser, said reservoir extending downwardly and away from the occupant as it extends from said connector means, and means associated with said connector means and said reservoir and actuatable to effect a flow of fluid from said reservoir through the connector means and into said diffuser.

5. Safety apparatus for protecting an occupant of a vehicle comprising a confinement having a collapsed inoperative condition and an expanded operative condition for restraining movement of the occupant during a collision, means for expanding said confinement to said operative condition during a collision which may be critical to the occupant, said means for expanding said confinement including a fluid reservoir, means for establishing a fluid flow from said reservoir, a diffuser member which receives said flow, and connector means for providing fluid communication between said fluid reservoir and said diffuser member, said diffuser member being supported by the dashboard of the vehicle and having a wall positionable to receive the impact of an occupant thereagainst, said wall being unyielding to the pressure of the fluid and being inelastically deformable as a result of occupant impact thereagainst during a collision which is noncritical to the occupant, the deformation of said diffuser wall absorbing at least a part of the occupant's energy of impact to minimize the possibility of injury to the occupant, and said fluid reservoir being disposed on the vehicle in spaced relationship relative to said diffuser member to minimize the chance of impact therewith by the occupant of the vehicle.

6. A safety apparatus for protecting an occupant of a vehicle during both a critical collision and a noncritical collision comprising a confinement which is expandable to restrain movement of the occupant of the vehicle during said critical collision by at least partially absorbing the kinetic energy of the occupant, a reservoir for supplying fluid to effect an expansion of said confinement upon the occurrence of said critical collision, said reservoir being located adjacent to a longitudinally extending side portion of a passenger compartment of the vehicle and extending transversely from the side portion into said passenger compartment for a distance which is less then one fourth of the transverse extent of said confinement when it is expanded, and means connected in fluid communication with said reservoir and said confinement for directing a flow of fluid from said reservoir into said confinement during said critical collision and for inelastically crushing under the influence of impact of the occupant of the vehicle during said noncritical collision to thereby at least partially absorb the kinetic energy of the occupant of the vehicle during said noncritical collision, said means being unyieldable to the pressure of fluid therein and positionable to receive an occupant's impact thereagainst during said noncritical collision.